US012645411B2

(12) United States Patent
Hamada

(10) Patent No.: US 12,645,411 B2
(45) Date of Patent: Jun. 2, 2026

(54) IMAGE FORMING APPARATUS, IMAGE FORMING METHOD, AND NON-TRANSITORY COMPUTER READABLE MEDIUM

(71) Applicant: FUJIFILM Business Innovation Corp., Tokyo (JP)

(72) Inventor: Susumu Hamada, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 18/182,420

(22) Filed: Mar. 13, 2023

(65) Prior Publication Data

US 2024/0069833 A1 Feb. 29, 2024

(30) Foreign Application Priority Data

Aug. 24, 2022 (JP) ................................. 2022-133557

(51) Int. Cl.
*G06F 3/12* (2006.01)

(52) U.S. Cl.
CPC ............ *G06F 3/126* (2013.01); *G06F 3/1204* (2013.01); *G06F 3/1236* (2013.01); *G06F 3/1267* (2013.01)

(58) Field of Classification Search
CPC ...... G06F 3/126; G06F 3/1204; G06F 3/1236; G06F 3/1267; G06F 3/12; Y02D 10/00
See application file for complete search history.

(56) References Cited

U.S. PATENT DOCUMENTS

| | | | | |
|---|---|---|---|---|
| 7,424,231 B2 * | 9/2008 | Shigeta | .............. | H04N 1/00002 |
| | | | | 399/8 |
| 8,830,518 B2 * | 9/2014 | Yamada | ................ | G06F 3/1261 |
| | | | | 358/1.15 |
| 2012/0069394 A1 * | 3/2012 | Ono | ...................... | G06F 3/1288 |
| | | | | 358/1.15 |
| 2013/0188221 A1 * | 7/2013 | Ohno | .................... | G06F 3/1288 |
| | | | | 358/1.15 |
| 2015/0193762 A1 * | 7/2015 | Sugiyama | ............ | G06Q 20/209 |
| | | | | 358/1.15 |
| 2017/0156172 A1 * | 6/2017 | Yokoyama | ............ | H04W 68/12 |
| 2017/0371602 A1 * | 12/2017 | Panda | .................... | G06F 3/1232 |
| 2019/0265919 A1 * | 8/2019 | Mohammad | .......... | G06F 3/1222 |
| 2020/0089443 A1 * | 3/2020 | Kashiwagi | ............ | G06F 3/1288 |
| 2023/0087856 A1 * | 3/2023 | Sharma | ................ | G06F 3/1267 |
| | | | | 358/1.14 |

FOREIGN PATENT DOCUMENTS

JP 2003-341175 A 12/2003

* cited by examiner

*Primary Examiner* — Helen Zong
(74) *Attorney, Agent, or Firm* — Oliff PLC

(57) ABSTRACT

An image forming apparatus, which is also referred to as a first image forming apparatus and is configured to perform a printing process by acquiring print information retained by a second image forming apparatus, includes a processor configured to: perform the printing process in a situation where the print information is unavailable from the second image forming apparatus and where the print information is retained by a second virtual image forming apparatus that is a virtual apparatus corresponding to the second image forming apparatus, by acquiring the print information retained by the second virtual image forming apparatus.

13 Claims, 7 Drawing Sheets

| TYPE | IDENTIFYING INFORMATION | | |
|---|---|---|---|
| | APPARATUS 50A | APPARATUS 50B | APPARATUS 50C |
| SERIAL No. OF FIRST APPARATUS | AAAA | BBBB | CCCC |
| SERIAL No. OF SECOND APPARATUS | BBBB CCCC | AAAA CCCC | AAAA BBBB |
| IP ADDRESS OF FIRST APPARATUS | 1.1.1.1 | 1.1.1.2 | 1.1.1.3 |
| IP ADDRESS OF SECOND APPARATUS | 1.1.1.2 1.1.1.3 | 1.1.1.1 1.1.1.3 | 1.1.1.1 1.1.1.2 |

IMAGE FORMING APPARATUS, IMAGE FORMING METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2022-133557 filed Aug. 24, 2022.

BACKGROUND

(i) Technical Field

The present disclosure relates to an image forming apparatus, an image forming method, and a non-transitory computer readable medium.

(ii) Related Art

Serverless on-demand printing services have been provided based on a technology as described below.

Japanese Unexamined Patent Application Publication No. 2003-341175 discloses an image forming apparatus configured to share an authenticating function for a stored document and enable the output of a stored document without wasting the resources of a network and a multifunctional peripheral.

The image forming apparatus includes a hardware resource to be used for an image forming process, a program configured to provide processing of user service with regard to image formation, and a document-storing unit configured to store a document to be stored.

Further, the image forming apparatus, which is referred to as a first image forming apparatus, has a document-management service configured to i) receive a request from an external network device for the verifying information with regard to a document stored in the document-storing unit; transmit the verifying information to the network device in response to the request for verifying information after creating the verifying information in accordance with the request for verifying information; ii) receive a request for a stored document based on the verifying information from a document-output service of a second image forming apparatus; and in response to the request, transmit the stored document to the document-output service of the second image forming apparatus after acquiring the stored document from the document-storing unit in accordance with the verifying information.

SUMMARY

However, in this technology, when the first image forming apparatus, from which a user wants to obtain printed matter, is to perform printing by acquiring, from the second image forming apparatus, print information that is retained by the second image forming apparatus and that is subjected to printing, the first image forming apparatus is not able to perform a printing process based on the print information if the print information is unavailable from the second image forming apparatus.

Aspects of non-limiting embodiments of the present disclosure relate to providing an image forming apparatus, an image forming method, and a non-transitory computer readable medium that allow a user to perform a printing process based on print information by using the first image forming apparatus if the print information is unavailable from the second image forming apparatus.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an image forming apparatus also referred to as a first image forming apparatus, the first image forming apparatus being configured to perform a printing process by acquiring print information retained by a second image forming apparatus, the first image forming apparatus including a processor configured to: perform the printing process in a situation where the print information is unavailable from the second image forming apparatus and where the print information is retained by a second virtual image forming apparatus that is a virtual apparatus corresponding to the second image forming apparatus, by acquiring the print information retained by the second virtual image forming apparatus.

BRIEF DESCRIPTION OF THE DRAWINGS

An exemplary embodiment of the present disclosure will be described in detail based on the following figures, wherein.

DETAILED DESCRIPTION

Hereinafter, an exemplary embodiment of the present disclosure will be described in detail with reference to the drawings. In the present exemplary embodiment, description will be given with regard to the case where a technology according to the exemplary embodiment of the present disclosure is applied to an image forming system configured to provide a cloud-based printing service to geographically distributed multiple image forming apparatuses installed in shared office spaces, on premises, or at other locations. In the cloud-based printing service, each image forming apparatus is accessed as a virtual printer, which is a virtual apparatus corresponding to the image forming apparatus. Using this service, a user on the road is able to perform printing via the cloud by using an image forming apparatus installed on a network if the user has only access to a terminal apparatus that is not allowed the connection to the network. In the present exemplary embodiment, description will be given with regard to the case where the technology according to the exemplary embodiment of the present disclosure is applied to the image forming system configured to provide serverless on-demand printing (abbreviated to "SODP" below) service. Using this service, a user is able to directly use print information retained by another image forming apparatus and perform a printing process based on the print information without the help of a server.

Figure 1:
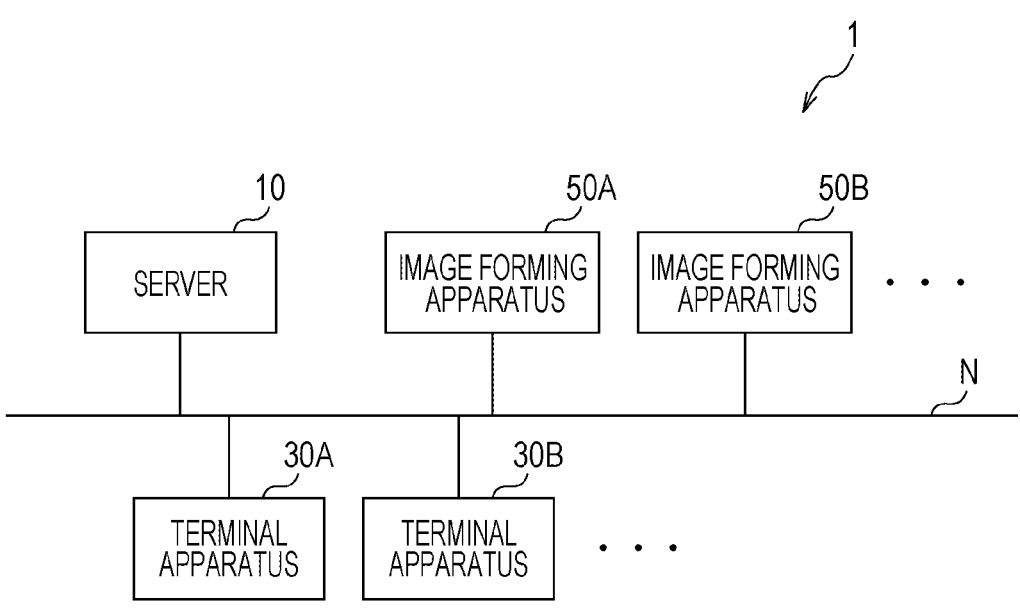
FIG. 1 is a block diagram depicting an example of the configuration of an image forming system according to the exemplary embodiment of the present disclosure.

First, referring to FIG. 1, the configuration of an image forming system 1 according to the present exemplary embodiment will be described. FIG. 1 is a block diagram depicting an example of the configuration of the image forming system 1 according to the present exemplary embodiment.

As depicted in FIG. 1, the image forming system 1 according to the present exemplary embodiment includes a server 10, multiple terminal apparatuses 30A, 30B, . . . , and multiple image forming apparatuses 50A, 50B, . . . . The terminal apparatuses 30A, 30B, . . . are each simply referred to as a "terminal apparatus 30" when the terminal apparatuses are not distinguished from each other in the following description. In addition, the image forming apparatuses 50A, 50B, . . . are each simply referred to as an "image forming apparatus 50" when the image forming apparatuses are not distinguished from each other in the following description.

Examples of the server 10 and the terminal apparatuses 30 include an information processing apparatus such as a personal computer or a server computer. Further, the image forming apparatus 50 in the present exemplary embodiment is assumed to be a digital multifunction peripheral having functions such as an image printing function, an image reading function, and an image transmitting function. However, examples of the image forming apparatus 50 are not limited to a digital multifunction peripheral of this type and may include other image forming apparatuses, such as an image forming apparatus having only an image printing function or an image forming apparatus having only image printing and reading functions.

Obviously, the image forming apparatuses 50A, 50B, . . . do not necessarily have the same specification, and services that can be provided, items that can be configured to provide such services, or optionally installed components may be different.

The server 10, the terminal apparatuses 30, and the image forming apparatuses 50 are connected to each other by using a network N, and the server 10 is able to communicate with each of the terminal apparatuses 30 and each of the image forming apparatuses 50 via the network N.

A combination of a public communication network, such as the Internet or a telephone network, and an on-premises communication network, such as a local area network (LAN) or a wide area network (WAN), is used as the network N in the present exemplary embodiment by way of illustration and not by way of limitation. For example, only one of the public communication network and the on-premises communication network may be used as the network N. Wireline and wireless communication networks are used as the network N in the present exemplary embodiment by way of illustration and not by way of limitation, and only one of a wireless communication network and a wireline communication network may be used.

Figure 2:
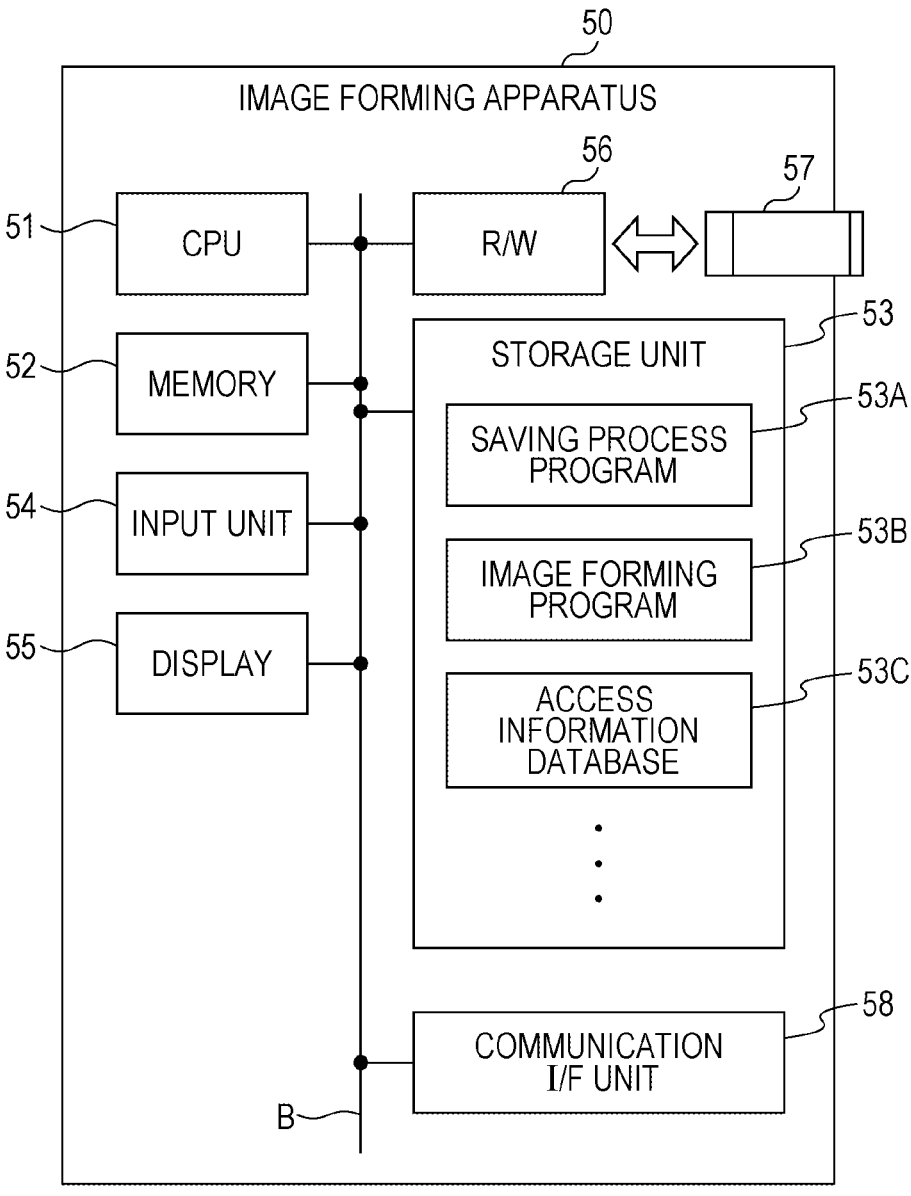
FIG. 2 is a block diagram depicting an example of the hardware configuration of the electrical system of an image forming apparatus according to the exemplary embodiment of the present disclosure.

Next, referring to FIG. 2, the configuration of the image forming apparatus 50 according to the present exemplary embodiment will be described. FIG. 2 is a block diagram depicting an example of the hardware configuration of the electrical system of the image forming apparatus 50 according to the present exemplary embodiment.

As depicted in FIG. 2, the image forming apparatus 50 according to the present exemplary embodiment includes a central processing unit (CPU) 51 as a processor, a memory 52 as a temporary storage region, a non-volatile storage unit 53, an input unit 54 equipped with various switches, a display 55 such as a liquid crystal display, a media reader/writer (R/W) 56, and a communication interface (I/F) unit 58. The CPU 51, the memory 52, the storage unit 53, the input unit 54, the display 55, the media reader/writer 56, and the communication I/F unit 58 are connected to each other by using a bus B. The media reader/writer 56 is configured to read information stored in a recording medium 57 and write information into the recording medium 57.

The storage unit 53 according to the present exemplary embodiment is formed by a device such as a hard disk drive (HDD), a solid state drive (SSD), or a flash memory. The storage unit 53 as a storage medium stores a saving process program 53A and an image forming program 53B. The saving process program 53A, which is saved to the recording medium 57, is read by the media reader/writer 56 from the recording medium 57, which is connected to the media reader/writer 56, and the saving process program 53A is saved (installed) to the storage unit 53. The image forming program 53B, which is also saved to the recording medium 57, is read by the media reader/writer 56 from the recording medium 57, which is connected to the media reader/writer 56, and the image forming program 53B is saved (installed) to the storage unit 53. The CPU 51 is configured to sequentially execute processes included in the saving process program 53A and the image forming program 53B by reading the programs in the storage unit 53 as appropriate and loading the programs onto the memory 52.

The storage unit 53 also stores an access information database 53C. The access information database 53C will be described in detail below.

The image forming apparatus 50 obviously includes devices associated with image processing, such as an image forming engine and an image reading device, although those devices are not depicted.

Figure 3:
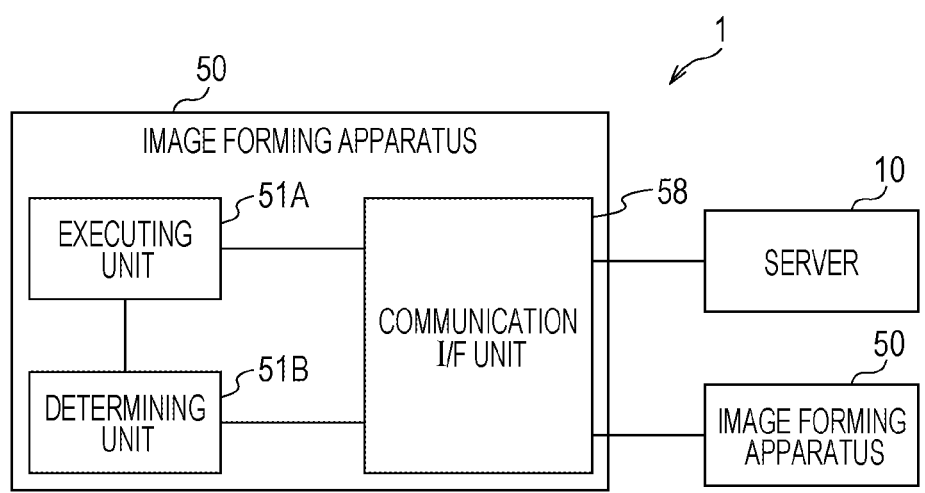
FIG. 3 is a block diagram depicting an example of the functional configuration of the image forming apparatus according to the exemplary embodiment of the present disclosure.

Next, referring to FIG. 3, the functional configuration of the image forming apparatus 50 according to the present exemplary embodiment will be described. FIG. 3 is a block diagram depicting an example of the functional configuration of the image forming apparatus 50 according to the present exemplary embodiment.

As depicted in FIG. 3, the image forming apparatus 50 includes an executing unit 51A and a determining unit 51B. The CPU 51 of the image forming apparatus 50 is configured to function as the executing unit 51A and the determining unit 51B by executing the saving process program 53A and the image forming program 53B.

The executing unit 51A according to the present exemplary embodiment is configured to perform the following processes when performing a printing process by acquiring print information retained by another image forming apparatus 50 (referred to as a "second image forming apparatus" below, whereas the image forming apparatus 50 including the executing unit 51A according to the present exemplary embodiment is referred to as a "first image forming apparatus"). Specifically, the executing unit 51A is configured to perform the printing process in a situation where the print information is unavailable from the second image forming apparatus and where the print information is retained by a second virtual image forming apparatus that is a virtual apparatus corresponding to the second image forming apparatus, by acquiring the print information retained by the second virtual image forming apparatus.

In addition, the executing unit 51A according to the present exemplary embodiment is configured to further perform a saving process in which print information saved to the first image forming apparatus is saved at a predetermined time to a first virtual image forming apparatus that is a virtual apparatus corresponding to the first image forming apparatus.

The first and second virtual image forming apparatuses each correspond to a virtual printer described above, and the first virtual image forming apparatus and the second virtual image forming apparatus are virtual printers corresponding to the first image forming apparatus 50 and the second image forming apparatus, respectively.

The predetermined time is assumed to be a time that the print information is saved to the first image forming apparatus in the present exemplary embodiment, but this is not meant to be limiting. For example, the predetermined time may be set to the time that the user directs, by using a unit such as the terminal apparatus 30 or the input unit 54, that the print information be saved to the first virtual image forming apparatus.

In the present exemplary embodiment, the situation where print information is unavailable from the second image forming apparatus is assumed to be a situation where the second image forming apparatus is not communicatively connected, but this is not meant to be limiting. For example, a situation where the second image forming apparatus is in the middle of printing based on other print information may be designated as the situation where print information is unavailable from the second image forming apparatus.

Further, the situation where the second image forming apparatus is not communicatively connected is assumed to be a situation where the second image forming apparatus is not powered in the present exemplary embodiment, but this is not meant to be limiting. For example, a situation where the second image forming apparatus is in the sleep state and is not capable of communicating with other apparatuses may be designated as the situation where the second image forming apparatus is not communicatively connected.

The executing unit 51A according to the present exemplary embodiment is configured to use, as information for accessing the second virtual image forming apparatus, information containing identifying information with which the second image forming apparatus is identifiable. The executing unit 51A according to the present exemplary embodiment is configured to use the serial number of the second image forming apparatus as the identifying information, but this is not meant to be limiting. For example, the media access control (MAC) address or the universally unique identifier (UUID) as the information for identifying an individual piece of second image forming apparatus or the IP address of the second image forming apparatus may be used as the identifying information.

The determining unit 51B according to the present exemplary embodiment is configured to determine whether to first access the second image forming apparatus or the second virtual image forming apparatus in accordance with a predetermined criterion. The predetermined criterion is assumed to be that an apparatus having a higher speed of communication is to be first accessed in the present exemplary embodiment, but this is not meant to be limiting. For example, whether the second image forming apparatus is in the middle of a printing process based on other print information may be defined as the predetermined criterion. In this case, the second virtual image forming apparatus is to be first accessed while the second image forming apparatus is in the middle of a printing process based on other print information, and the second image forming apparatus is to be first accessed while the second image forming apparatus is not in the middle of a printing process based on other print information.

Further, in the present exemplary embodiment, the apparatus having a higher speed of communication is the second image forming apparatus during a time period in which the frequency of use of the second image forming apparatus is less than a predetermined threshold, and the apparatus having a higher speed of communication is the second virtual image forming apparatus during a time period in which the frequency of use is equal to the predetermined threshold or more. However, this is not meant to be limiting, and the apparatus having a higher speed of communication may simply be designated irrespective of the frequency of use in accordance with the comparison between the speed of communication of the second image forming apparatus and the speed of communication of the second virtual image forming apparatus. The number of printed sheets per hour is used as the frequency of use with the threshold being set to 100 sheets in the present exemplary embodiment by way of non-limiting example, and obviously, the frequency of use and the threshold may both be replaced by other physical quantities representing the frequency of use and corresponding thresholds.

Figure 4:
FIG. 4 is a schematic diagram depicting an example of the configuration of an access information database according to the exemplary embodiment of the present disclosure.

Next, referring to FIG. 4, the access information database 53C according to the present exemplary embodiment will be described. FIG. 4 is a schematic diagram depicting an example of the configuration of the access information database 53C according to the present exemplary embodiment.

The identifying information described above is registered in the access information database 53C according to the present exemplary embodiment, and as depicted in FIG. 4 as an example, the type and the identifying information are associated with each other and stored.

The type indicates the type of identifying information, and there are 4 types of identifying information, which are the serial number of the first apparatus, the serial number of the second apparatus, the IP address of the first apparatus, and the IP address of the second apparatus. The identifying information includes the corresponding type of information representing the serial number of the corresponding image forming apparatus 50. The identifying information includes the corresponding type of information representing the IP address of the corresponding image forming apparatus 50. The example depicted in FIG. 4 represents the case where there are only 3 corresponding image forming apparatuses 50.

In the example depicted in FIG. 4, the serial number of the first image forming apparatus 50A is denoted by "AAAA", and the serial numbers of the second image forming apparatuses (the image forming apparatuses 50B and 50C in the example depicted in FIG. 4), which are associated with the first image forming apparatus 50A, are denoted by "BBBB" and "CCCC". In the example depicted in FIG. 4, the IP address of the first image forming apparatus 50A is denoted by "1.1.1.1", and the IP addresses of the second image forming apparatuses (the image forming apparatuses 50B and 50C), which are associated with the first image forming apparatus 50A, are denoted by "1.1.1.2" and "1.1.1.3".

A database, which is not depicted, is created on the storage unit of the server 10 according to the present exemplary embodiment, and the database (referred to as a "frequency-of-use information database" in the following description) contains registered information representing the frequency of use, which is described above, for each of the image forming apparatuses 50 and for each predetermined time period. The frequencies of use in this database are updated to the latest data at predetermined intervals (updated once a week in the present exemplary embodiment).

Next, referring to FIGS. 5 to 7, description will be given with regard to how the image forming system 1 operates according to the present exemplary embodiment.

First, referring to FIGS. 5 and 7, description will be given with regard to how the image forming apparatuses 50 operate when a saving process is performed. FIG. 5 is a flowchart depicting an example of the saving process according to the present exemplary embodiment.

Figure 5:
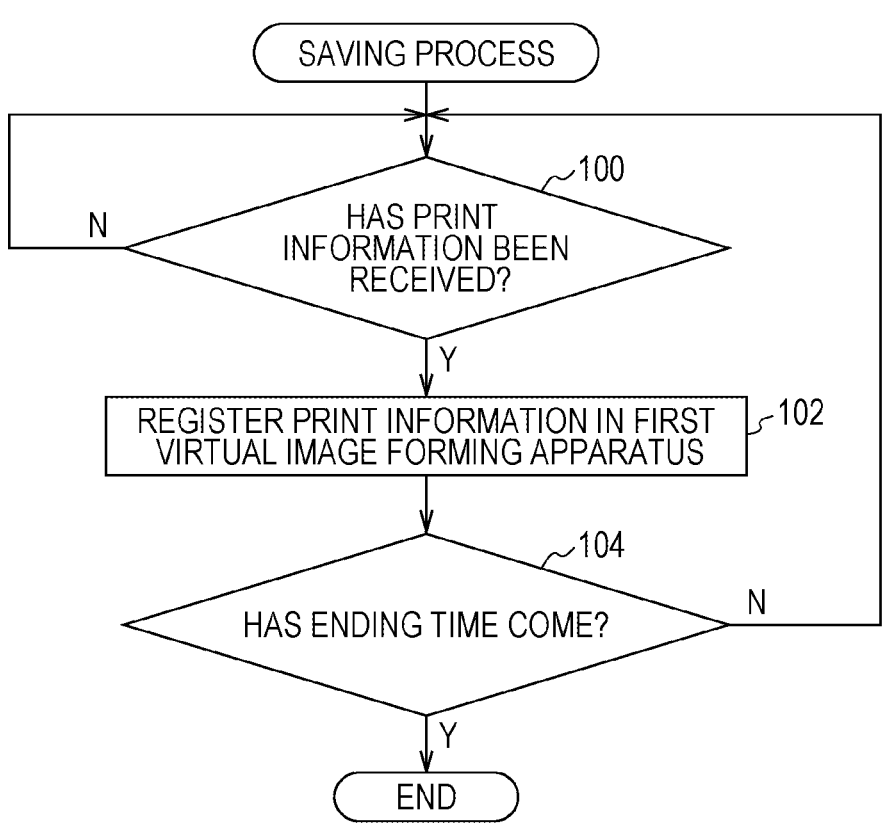
FIG. 5 is a flowchart depicting an example of a saving process according to the exemplary embodiment of the present disclosure.

In the present exemplary embodiment, when the image forming apparatus 50, which is referred to as the first image forming apparatus, is turned on, the CPU 51 of the first image forming apparatus 50 executes the saving process program 53A, and the saving process depicted in FIG. 5 is performed. To avoid complexities, description will be given below with regard to the case where a virtual printer of each of the image forming apparatuses 50 has been built on the server 10.

In step 100 in FIG. 5, the CPU 51 waits for receiving print information from any one of the terminal apparatuses 30. In step 102, the CPU 51 saves the received print information to the storage unit 53 of the first image forming apparatus 50 and also registers the received print information in the first virtual image forming apparatus.

In step 104, the CPU 51 determines whether the ending time chosen in advance as the time to finish the saving process has come, then returns to step 100 if a negative determination is made, or finishes the saving process if an affirmative determination is made. In the present exemplary embodiment, the time that the first image forming apparatus 50 is turned off is chosen as the ending time, but this choice is not meant to be limiting. For example, the time that the user enters, by using a unit such as the input unit 54, an instruction to finish the saving process may be chosen as the ending time.

Figure 7:
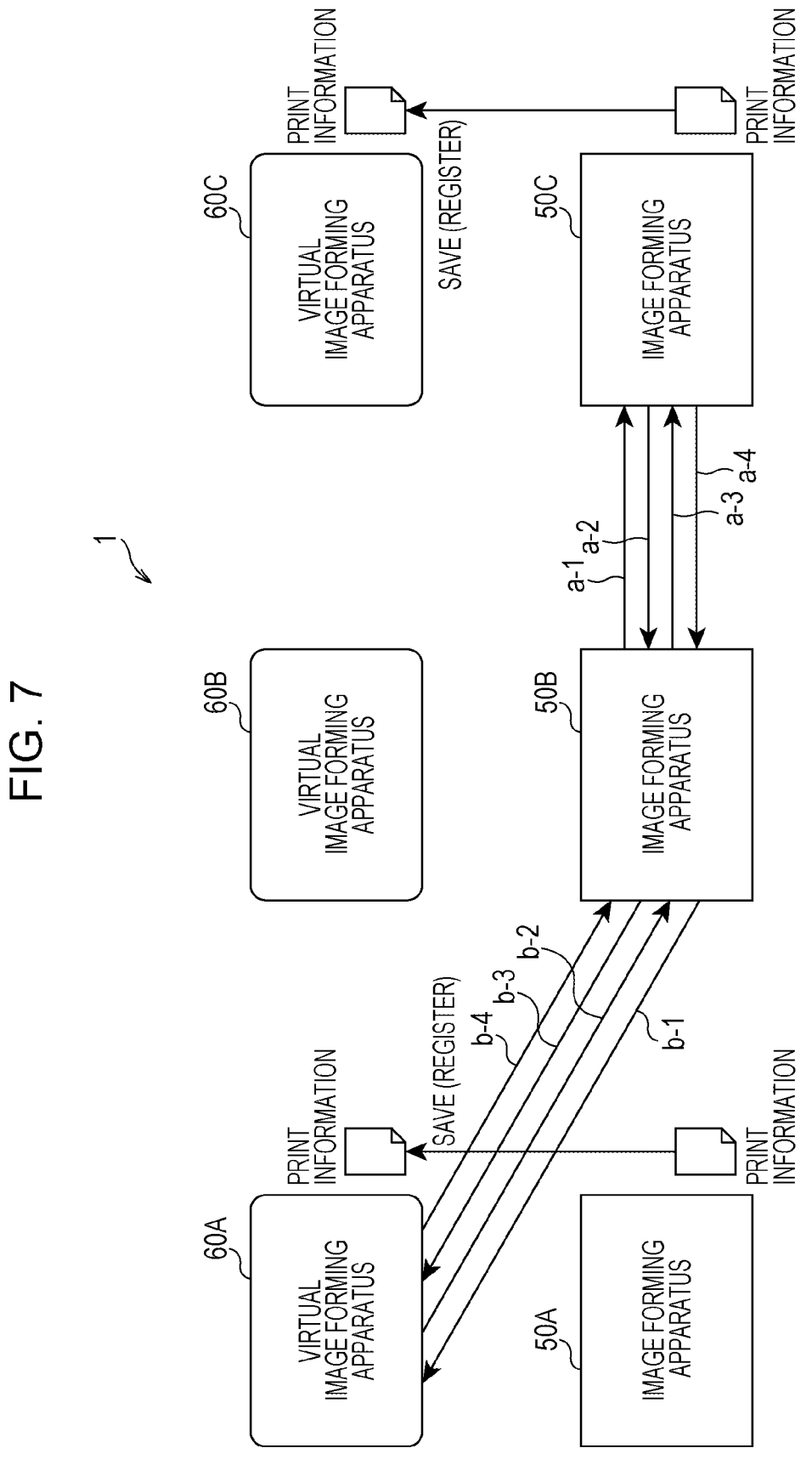
FIG. 7 is a diagram for describing an image forming process according to the exemplary embodiment of the present disclosure and is a block diagram depicting an example of exchanges of transmit/receive information between image forming apparatuses and virtual image forming apparatuses.

As depicted in FIG. 7 as an example, print information saved to the first image forming apparatus 50 can be saved to the first virtual image forming apparatus at the time that the print information is saved to the first image forming apparatus 50 in the saving process described above. FIG. 7 is a diagram for describing the image forming process according to the present exemplary embodiment and is a block diagram depicting an example of exchanges of transmit/receive information between image forming apparatuses 50 and virtual image forming apparatuses 60A, 60B, .... To avoid complexities, FIG. 7 depicts the case where there are only 3 image forming apparatuses 50.

Figure 6A:
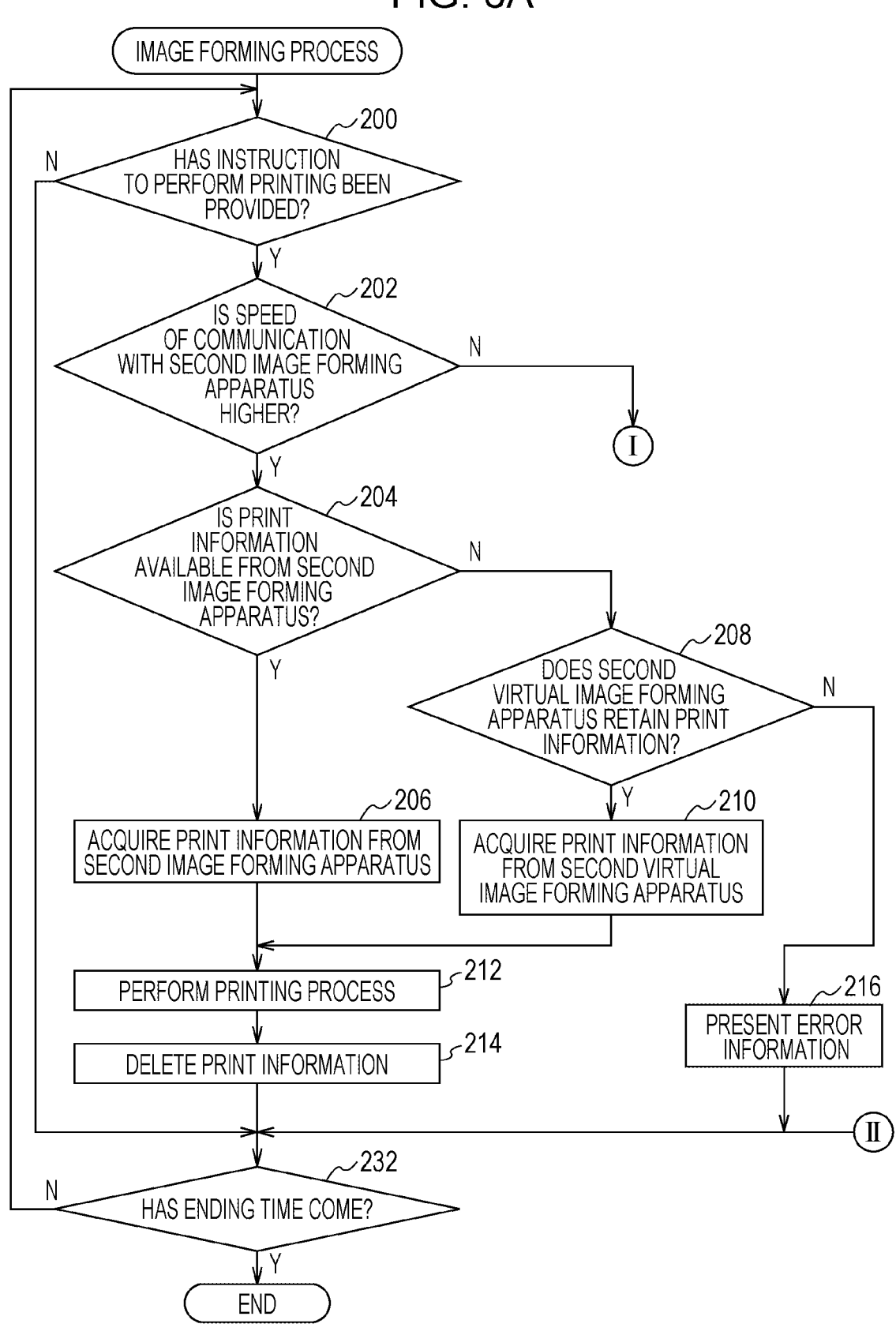
FIGS. 6A and 6B illustrate a flowchart depicting an example of an image forming process according to the exemplary embodiment of the present disclosure.
Figure 6B:
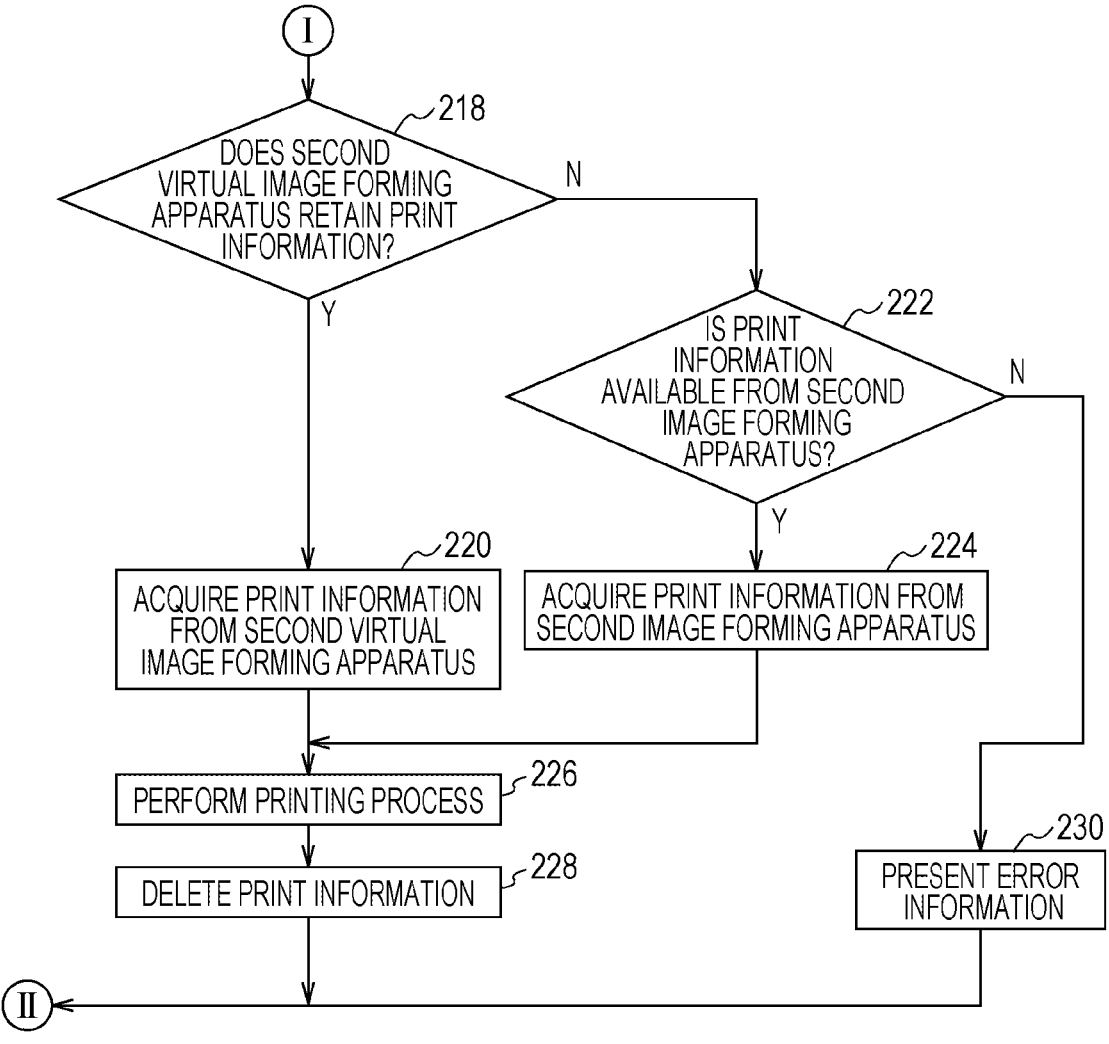

Next, referring to FIGS. 6A, 6B, and 7, description will be given with regard to how the image forming apparatuses 50 operate when performing the image forming process. FIGS. 6A and 6B illustrate a flowchart depicting an example of the image forming process according to the present exemplary embodiment.

In the present exemplary embodiment, when the first image forming apparatus 50 is turned on, the CPU 51 of the first image forming apparatus 50 executes the image forming program 53B, and the image forming process depicted in FIGS. 6A and 6B is performed. To avoid complexities, description will be given below with regard to the case where a virtual printer of each of the image forming apparatuses 50 has been built on the server 10 and the access information database 53C has also been built.

In step 200 in FIG. 6A, the CPU 51 determines whether any user (referred to as a "target user" below) has provided an instruction to perform printing based on print information retained by a second image forming apparatus, then proceeds to step 232 if a negative determination is made, or proceeds to step 202 if an affirmative determination is made.

When the target user logs in to any image forming apparatus 50, which is referred to as the first image forming apparatus, and via the input unit 54 and by using the SODP service, provides the instruction to perform printing based on print information registered in any second image forming apparatus, it is determined in the present exemplary embodiment that the instruction to perform printing is provided. However, this is not meant to be limiting, and, for example, when the target user does not use the SODP service to provide the instruction to perform printing based on print information registered in a second image forming apparatus, it may be determined that the instruction to perform printing is provided. In the following description, the second image forming apparatus selected by the target user is referred to as the "target second image forming apparatus".

In step 202, the CPU 51 determines whether the speed of communication with the target second image forming apparatus is higher than the speed of communication with the second virtual image forming apparatus (referred to as the "target second virtual image forming apparatus" below) corresponding to the target second image forming apparatus and proceeds to step 204 if an affirmative determination is made.

In the present exemplary embodiment, the determination in step 202 is made by reference to the frequency-of-use information database described above, and it is determined that the speed of communication with the target second image forming apparatus is higher during a time period in which the frequency of use of the target second image forming apparatus is less than the threshold. It is determined that the speed of communication with the target second virtual image forming apparatus is higher during a time period in which the frequency of use of the target second image forming apparatus is equal to the threshold or more. However, this is not meant to be limiting as described above.

In step 204, the CPU 51 determines whether print information is available from the target second image forming apparatus and proceeds to step 206 if an affirmative determination is made. In the present exemplary embodiment, the CPU 51 determines whether print information is available from the target second image forming apparatus by checking with the target second image forming apparatus whether the target second image forming apparatus is turned on and communicatively connected, but this is not meant to be limiting as described above. The CPU 51 may determine whether the target second image forming apparatus is turned off by determining whether a timeout occurs in response to a request to access the target second image forming apparatus.

In step 206, the CPU 51 accesses the target second image forming apparatus, acquires the print information as described below, and thereafter proceeds to step 212. Referring to FIG. 7 as an example, description will be given with regard to the case where the image forming apparatus 50B in FIG. 7 is the first image forming apparatus and the image forming apparatus 50C in FIG. 7 is the target second image forming apparatus.

First, the CPU 51 requests, from the target second image forming apparatus, a print information list registered by the target user who logs in to the first image forming apparatus (corresponding to a-1 in FIG. 7). The CPU 51 acquires the IP address of the target second image forming apparatus from the access information database 53C and accesses the target second image forming apparatus by using the acquired IP address at this time.

In response to the request, the target second image forming apparatus transmits the print information list registered by the target user to the first image forming apparatus (corresponding to a-2 in FIG. 7).

Then, the CPU 51 selects the print information requested by the target user for printing from the list received from the target second image forming apparatus and requests the transmission of the print information (corresponding to a-3 in FIG. 7).

In response to the request, the target second image forming apparatus transmits the requested print information to the first image forming apparatus and also transmits an instruction to perform a printing process based on the print information to the first image forming apparatus (corresponding to a-4 in FIG. 7).

In contrast, the CPU 51 proceeds to step 208 if a negative determination is made in step 204, that is, if the print information is unavailable from the target second image forming apparatus.

In step 208, the CPU 51 determines whether the target second virtual image forming apparatus retains the print information registered by the target user and proceeds to step 210 if an affirmative determination is made. In the present exemplary embodiment, the CPU 51 sends an inquiry to the target second virtual image forming apparatus to determine whether the target second virtual image forming apparatus retains the print information registered by the target user, but obviously, this is not meant to be limiting.

In step 210, the CPU 51 accesses the target second virtual image forming apparatus, acquires the print information as described below, and thereafter proceeds to step 212. Referring to FIG. 7 as an example, description will be given with regard to the case where the image forming apparatus 50B in FIG. 7 is the first image forming apparatus and the virtual image forming apparatus 60A is the target second virtual image forming apparatus.

First, the CPU 51 requests, from the target second virtual image forming apparatus, a print information list registered by the target user who logs in to the first image forming apparatus (corresponding to b-1 in FIG. 7). The CPU 51 acquires the serial number of the target second virtual image forming apparatus from the access information database 53C and accesses the target second virtual image forming apparatus by using the acquired serial number at this time. As an example of the method of accessing the target second virtual image forming apparatus by using a serial number, the serial number may be included in the uniform resource locator (URL). This method of accessing the target second virtual image forming apparatus is more reliable than the method by using the IP address.

In response to the request, the target second virtual image forming apparatus transmits the print information list registered by the target user to the first image forming apparatus (corresponding to b-2 in FIG. 7).

Then, the CPU 51 selects the print information requested by the target user for printing from the list received from the target second virtual image forming apparatus and requests the transmission of the print information (corresponding to b-3 in FIG. 7).

In response to the request, the target second virtual image forming apparatus transmits the requested print information to the first image forming apparatus and also transmits an instruction to perform a printing process based on the print information to the first image forming apparatus (corresponding to b-4 in FIG. 7).

In step 212, the CPU 51 performs a printing process based on the print information acquired by the process in step 206 or in step 210. In step 214, the CPU 51 deletes the print information and thereafter proceeds to step 232.

In contrast, if a negative determination is made in step 208, the CPU 51 determines that the print information is unavailable and proceeds to step 216.

In step 216, the CPU 51 causes predetermined information representing an error (referred to as "error information" below) to be presented and thereafter proceeds to step 232. In the present exemplary embodiment, the display 55 is configured to present the error information, but this is not meant to be limiting. For example, the error information may be presented in a print form or in a voice.

In contrast, if a negative determination is made in step 202, that is, if the speed of communication with the target second image forming apparatus is not higher than the speed of communication with the target second virtual image forming apparatus, the CPU 51 proceeds to step 218.

In step 218, as in the process in step 208, the CPU 51 determines whether the target second virtual image forming apparatus retains the print information registered by the target user and proceeds to step 220 if an affirmative determination is made.

In step 220, as in the process in step 210, the CPU 51 accesses the target second virtual image forming apparatus, acquires the print information, and thereafter proceeds to step 226.

In contrast, the CPU 51 proceeds to step 222 if a negative determination is made in step 218, that is, if the target second virtual image forming apparatus does not retain the print information registered by the target user.

In step 222, as in the process in step 204, the CPU 51 determines whether the print information is available from the target second image forming apparatus and proceeds to step 224 if an affirmative determination is made.

In step 224, as in the process in step 206, the CPU 51 accesses the target second image forming apparatus, acquires the print information, and thereafter proceeds to step 226.

In step 226, the CPU 51 performs a printing process based on the print information acquired by the process in step 220 or in step 224. In step 228, the CPU 51 deletes the print information and thereafter proceeds to step 232.

In contrast, if a negative determination is made in step 222, the CPU 51 determines that the print information is unavailable and proceeds to step 230.

In step 230, as in the process in step 216, the CPU 51 causes the error information to be presented and thereafter proceeds to step 232.

In step 232, the CPU 51 determines whether the ending time chosen in advance as the time to finish the image forming process has come, then returns to step 200 if a negative determination is made, or finishes the image forming process if an affirmative determination is made. In the present exemplary embodiment, the time that the first image forming apparatus 50 is turned off is chosen as the ending time, but this choice is not meant to be limiting. For example, the time that the user enters, by using a unit such as the input unit 54, an instruction to finish the image forming process may be chosen as the ending time.

In the above exemplary embodiment, the description has been given with regard to the case where the technology according to the exemplary embodiment of the present disclosure is applied to a cloud-based printing service, but this is not meant to be limiting. For example, the present technology may be applied to a printing service that is not based on a cloud server, such as a printing service based on an on-premises network server.

In the above exemplary embodiment, the description has been given with regard to the case where the access information database 53C is registered in the first image forming apparatus 50, but this is not meant to be limiting. For example, the access information database 53C may be registered in the server 10 or a different apparatus that can be accessed by the first image forming apparatus 50.

In the above exemplary embodiment, the information exchanges between the first image forming apparatus and the second image forming apparatus and the information exchanges between the first image forming apparatus and the second virtual image forming apparatus have been described with reference to FIG. 7 by way of illustration and not by way of limitation. For example, the first image forming apparatus does not need to directly exchange information with the second virtual image forming apparatus and may exchange information with the second virtual image forming apparatus via a virtual image forming apparatus corresponding to the first image forming apparatus.

Further, in the above exemplary embodiment, situations such as the situation where the second image forming apparatus is powered off and the situation where the second image forming apparatus is in the sleep state have been described as examples of the situation where the print information is unavailable from the second image forming apparatus by way of illustration and not by way of limitation. For example, examples of the situation where the print information is unavailable from the second image forming apparatus include a situation where the second image forming apparatus is not able to instantly respond to a request from the first image forming apparatus because of an ongoing printing process in the second image forming apparatus and a situation where the second image forming apparatus is not able to instantly respond to a request from the first image forming apparatus because of a large amount of print information that has piled up in the second image forming apparatus.

In the above exemplary embodiment, description has not been given with regard to handling of print information that has been subjected to printing by the first image forming apparatus and that is retained by the second image forming apparatus and by the second virtual image forming apparatus, but print information that has been subjected to printing by the first image forming apparatus and that is retained by the second virtual image forming apparatus may be deleted. In such a case, the second image forming apparatus corresponding to the second virtual image forming apparatus may be powered off, and the print information retained by the second image forming apparatus may remain undeleted at this time. However, in such a case, the print information retained by the second image forming apparatus is deleted afterward when the second image forming apparatus is turned on and synchronized with the second virtual image forming apparatus.

The exemplary embodiment has been described as above, but the technical scope of the present disclosure is not limited to the range described in the above exemplary embodiment. Various modifications and improvements to the above exemplary embodiment are possible without departing from the spirit of the present disclosure, and embodiments incorporating such modifications or improvements are also within the technical scope of the present disclosure.

The above exemplary embodiment is not intended to limit the disclosure defined by the claims, and not all of the combinations of features described in the exemplary embodiment is necessary to constitute a solution in the disclosure. The exemplary embodiment described above includes solutions in various stages, and various solutions are extracted in accordance with the combinations of multiple disclosed elements. If some elements of all the elements described in the exemplary embodiment are removed, a configuration with these elements removed can be extracted as a solution as long as an effect is obtained.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

Further, in the above exemplary embodiment, the description has been given with regard to the case where the various kinds of processing are performed based on a software configuration in which a computer executes a program, but the present disclosure is not limited to this case. For example, various kinds of processing may be performed based on a hardware configuration or a combination of a hardware configuration and a software configuration.

In addition, the configuration of the image forming apparatus 50 described in the above exemplary embodiment is intended to be illustrative, and obviously an unnecessary element may be removed or a new element may be added without departing from the spirit of the present disclosure.

The various processes described in the above exemplary embodiment are also intended to be illustrative, and obviously, an unnecessary step may be removed, a new step may be added, or the process order may be changed without departing from the spirit of the present disclosure.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

APPENDIX (((1)))

An image forming apparatus also referred to as a first image forming apparatus, the first image forming apparatus being configured to perform a printing process by acquiring print information retained by a second image forming apparatus, the first image forming apparatus comprising:

a processor configured to:

perform the printing process in a situation where the print information is unavailable from the second image forming apparatus and where the print information is retained by a second virtual image forming apparatus that is a virtual apparatus corresponding to the second image forming apparatus, by acquiring the print information retained by the second virtual image forming apparatus.

(((2)))

The image forming apparatus according to (((1))), wherein the processor is configured to:

further perform a saving process in which print information saved to the first image forming apparatus is saved at a predetermined time to a first virtual image forming apparatus that is a virtual apparatus corresponding to the first image forming apparatus.

(((3)))

The image forming apparatus according to (((2))), wherein the predetermined time is a time that the print information is saved to the first image forming apparatus.

(((4)))

The image forming apparatus according to any one of (((1))) to (((3))), wherein the situation where the print information is unavailable from the second image forming apparatus is a situation where the second image forming apparatus is not communicatively connected to the first image forming apparatus.

(((5)))

The image forming apparatus according to (((4))), wherein the situation where the second image forming apparatus is not communicatively connected to the first image forming apparatus is a situation where the second image forming apparatus is not powered.

(((6)))

The image forming apparatus according to any one of (((1))) to (((5))), wherein the processor is configured to:

use, as information for accessing the second virtual image forming apparatus, information containing identifying information with which the second image forming apparatus is identifiable.

(((7)))

The image forming apparatus according to (((6))), wherein the identifying information is a serial number of the second image forming apparatus.

(((8)))

The image forming apparatus according to any one of (((1))) to (((7))), wherein the processor is configured to:

determine whether to first access the second image forming apparatus or the second virtual image forming apparatus in accordance with a predetermined criterion.

(((9)))

The image forming apparatus according to (((8))), wherein the predetermined criterion is that an apparatus having a higher speed of communication is to be first accessed.

(((10)))

The image forming apparatus according to (((9))), wherein the apparatus having a higher speed of communication is the second image forming apparatus during a time period in which frequency of use of the second image forming apparatus is less than a predetermined threshold and the apparatus having a higher speed of communication is the second virtual image forming apparatus during a time period in which the frequency of use is equal to the predetermined threshold or more.

What is claimed is:

1. An image forming apparatus also referred to as a first image forming apparatus, the first image forming apparatus being configured to perform a printing process by acquiring print information retained by a second image forming apparatus, the first image forming apparatus comprising:

a processor configured to:

perform the printing process in a situation where the print information is unavailable from the second image forming apparatus and where the print information is retained by a second virtual image forming apparatus that is a virtual apparatus corresponding to the second image forming apparatus, by acquiring the print information retained by the second virtual image forming apparatus, wherein the processor is configured to:

determine whether to first access the second image forming apparatus or the second virtual image forming apparatus in accordance with a predetermined criterion, the predetermined criterion being that an apparatus having a higher speed of communication is to be first accessed, and wherein the apparatus having a higher speed of communication is the second image forming apparatus during a time period in which frequency of use of the second image forming apparatus is less than a predetermined threshold, and is the second virtual image forming apparatus during a time period in which the frequency of use is equal to the predetermined threshold or more.

2. The image forming apparatus according to claim 1, wherein the processor is configured to:

further perform a saving process in which print information saved to the first image forming apparatus is saved at a predetermined time to a first virtual image forming apparatus that is a virtual apparatus corresponding to the first image forming apparatus.

3. The image forming apparatus according to claim 2, wherein the predetermined time is a time that the print information is saved to the first image forming apparatus.

4. The image forming apparatus according to claim 1, wherein the situation where the print information is unavailable from the second image forming apparatus is a situation where the second image forming apparatus is not communicatively connected to the first image forming apparatus.

5. The image forming apparatus according to claim 4, wherein the situation where the second image forming apparatus is not communicatively connected to the first image forming apparatus is a situation where the second image forming apparatus is not powered.

6. The image forming apparatus according to claim 1, wherein the processor is configured to:

use, as information for accessing the second virtual image forming apparatus, information containing identifying information with which the second image forming apparatus is identifiable.

7. The image forming apparatus according to claim 6, wherein the identifying information is a serial number of the second image forming apparatus.

8. The image forming apparatus according to claim 1, wherein the processor is configured to after the print information has been printed by the first image forming apparatus, upon the second image forming apparatus being powered on and synchronized with the second virtual image forming apparatus, cause the print information retained by the second image forming apparatus to be deleted from the second image forming apparatus.

9. A non-transitory computer readable medium storing a program causing a computer in a first image forming apparatus to execute a process for image formation, the first image forming apparatus being configured to perform a printing process by acquiring print information retained by a second image forming apparatus, the process comprising:

performing the printing process in a situation where the print information is unavailable from the second image forming apparatus and where the print information is retained by a second virtual image forming apparatus that is a virtual apparatus corresponding to the second image forming apparatus, by acquiring the print information retained by the second virtual image forming apparatus, wherein the process further comprises:

determining whether to first access the second image forming apparatus or the second virtual image forming apparatus in accordance with a predetermined criterion, the predetermined criterion being that an apparatus having a higher speed of communication is to be first accessed, and wherein the apparatus having a higher speed of communication is the second image forming apparatus during a time period in which frequency of use of the second image forming apparatus is less than a predetermined threshold, and is the second virtual image forming apparatus during a time period in which the frequency of use is equal to the predetermined threshold or more.

10. The non-transitory computer readable medium according to claim 9, wherein the process further comprises after the print information has been printed by the first image forming apparatus, upon the second image forming apparatus being powered on and synchronized with the second virtual image forming apparatus, causing the print information retained by the second image forming apparatus to be deleted from the second image forming apparatus.

11. An image forming method of performing a printing process in a first image forming apparatus by acquiring print information retained by a second image forming apparatus, the method comprising:

receiving, by the first image forming apparatus, an instruction to perform the printing process on print data retained by the second image forming apparatus;

transmitting, by the first image forming apparatus, a request to the second image forming apparatus to send the print data to the first image forming apparatus;

upon determining that the second image forming apparatus is unavailable to send the print data in response to the request, transmitting, by the first image forming apparatus, a request to a virtual image forming apparatus to send the print data to the first image forming apparatus; and upon receiving the print data from the virtual image forming apparatus, performing, by the first image forming apparatus, the printing process on the print data received from the virtual image forming apparatus.

12. The image forming method according to claim 11, wherein the method further comprises after the print data has been printed by the first image forming apparatus, upon the second image forming apparatus being powered on and synchronized with the virtual image forming apparatus, causing the print data retained by the second image forming apparatus to be deleted from the second image forming apparatus.

13. The image forming method according to claim 11, wherein the method further comprises determining whether to first access the second image forming apparatus or the virtual image forming apparatus in accordance with a predetermined criterion, the predetermined criterion being that an apparatus having a higher speed of communication is to be first accessed, wherein the apparatus having a higher speed of communication is the second image forming apparatus during a time period in which frequency of use of the second image forming apparatus is less than a predetermined threshold, and is the virtual image forming apparatus during a time period in which the frequency of use is equal to the predetermined threshold or more.

\* \* \* \* \*